(12) United States Patent
Othman

(10) Patent No.: US 10,494,009 B2
(45) Date of Patent: Dec. 3, 2019

(54) STROLLER ROCKING DEVICE

(71) Applicant: Rawan F. H. M. Othman, Kuwait (KW)

(72) Inventor: Rawan F. H. M. Othman, Kuwait (KW)

( * ) Notice: Subject to any disclaimer, the term of this patent is extended or adjusted under 35 U.S.C. 154(b) by 0 days.

(21) Appl. No.: 16/293,418

(22) Filed: Mar. 5, 2019

(65) Prior Publication Data

US 2019/0276064 A1    Sep. 12, 2019

Related U.S. Application Data

(60) Provisional application No. 62/639,020, filed on Mar. 6, 2018.

(51) Int. Cl.
| | | |
|---|---|---|
| *B62B 9/22* | (2006.01) | |
| *F16H 21/18* | (2006.01) | |
| *A47D 9/02* | (2006.01) | |

(52) U.S. Cl.
CPC ............ *B62B 9/22* (2013.01); *F16H 21/18* (2013.01); *A47D 9/02* (2013.01)

(58) Field of Classification Search
CPC .......... A47C 21/006; A47D 9/02; A47D 9/04; B62B 9/22
See application file for complete search history.

(56) References Cited

U.S. PATENT DOCUMENTS

| | | | | |
|---|---|---|---|---|
| 2,644,958 A | * | 7/1953 | Davis | ........................ A47D 9/02 5/109 |
| 3,048,419 A | * | 8/1962 | Fredman | .................. B62B 9/22 280/31 |
| 3,529,311 A | * | 9/1970 | Crawford | ............. A47C 21/006 5/109 |
| 4,287,779 A | | 9/1981 | Goncharov et al. | |
| 5,572,903 A | | 11/1996 | Lee | |
| 5,860,698 A | * | 1/1999 | Asenstorfer | ............. A47D 9/04 297/217.4 |
| 6,177,880 B1 | * | 1/2001 | Begum | .................. B62B 3/1408 340/5.9 |
| 6,431,646 B1 | | 8/2002 | Longoria | |
| 2004/0169425 A1 | | 9/2004 | Aihara | |

(Continued)

FOREIGN PATENT DOCUMENTS

WO   WO-2018164584 A1 *  9/2018  ............... A47D 9/02

*Primary Examiner* — Nicholas F Polito
(74) *Attorney, Agent, or Firm* — Richard C. Litman; Nath, Goldberg & Meyer

(57) ABSTRACT

A stroller rocking device includes a hollow housing and a strap mount pivotally attached to an outer surface thereof. A strap is provided, having a fixed end and a free end. The fixed end of the strap is secured to the strap mount, and the strap is adapted for releasably securing the hollow housing to a handle of a baby stroller. A motor is housed within a central chamber of the hollow housing, and a weighted piston is slidably disposed within a longitudinally extending chamber of the hollow housing. The weighted piston is selectively driven to linearly oscillate within the longitudinally extending chamber by the motor. The linear oscillation of the weighted piston within the longitudinally extending chamber of the hollow housing imparts an oscillating rocking motion to the baby stroller, the rocking motion being selectable between horizontal motion and vertical motion relative to the handle of the stroller.

2 Claims, 7 Drawing Sheets

(56) References Cited

U.S. PATENT DOCUMENTS

| | | | |
|---|---|---|---|
| 2007/0085286 A1* | 4/2007 | Gibree | B62B 9/22 280/47.38 |
| 2012/0023662 A1 | 2/2012 | Larsson | |
| 2015/0020308 A1* | 1/2015 | Reichle | A47D 15/00 5/93.1 |
| 2016/0107670 A1* | 4/2016 | Braidman | B62B 5/0026 280/47.1 |
| 2016/0353903 A1* | 12/2016 | Smilowitz | A47D 9/04 |

* cited by examiner

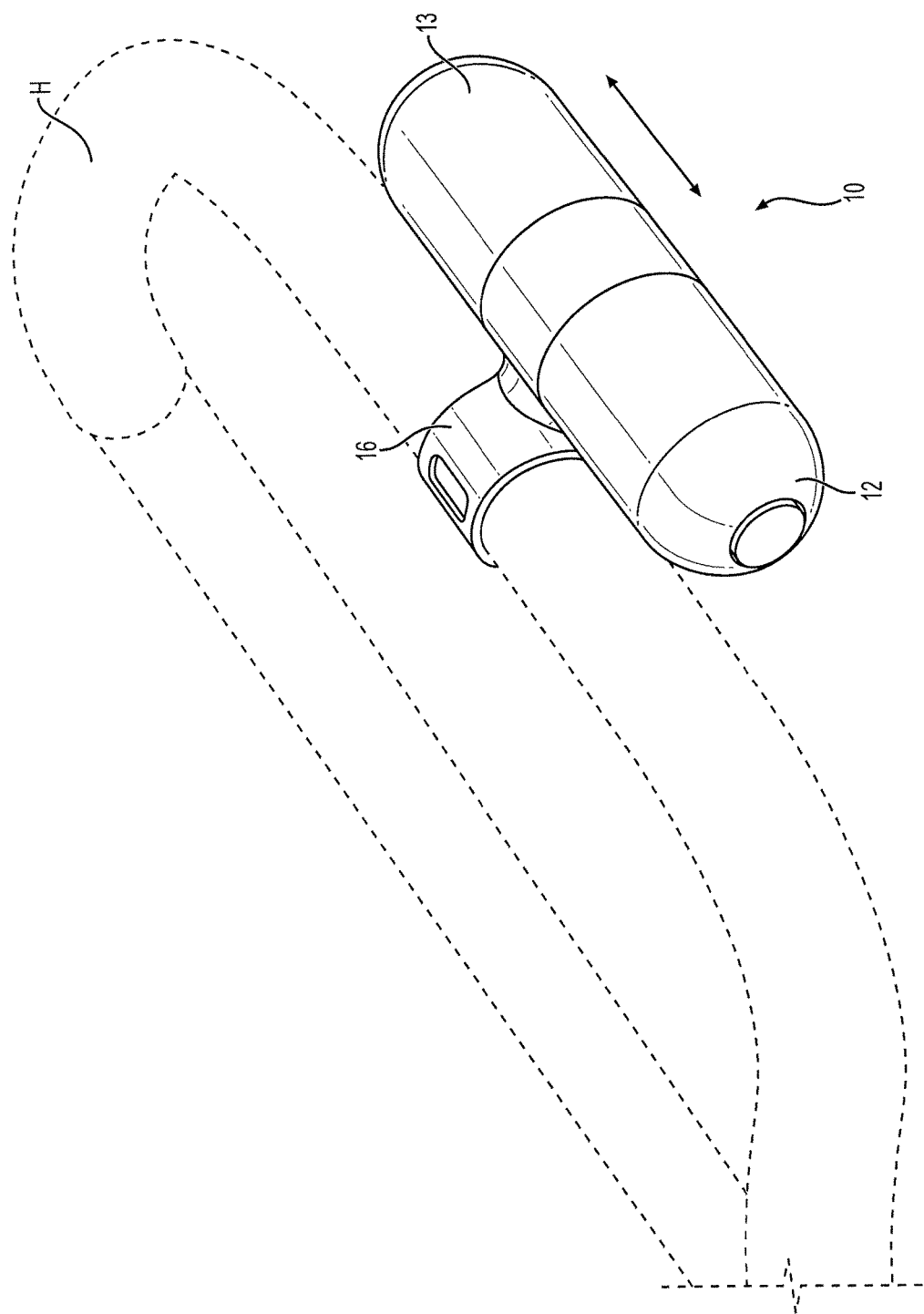

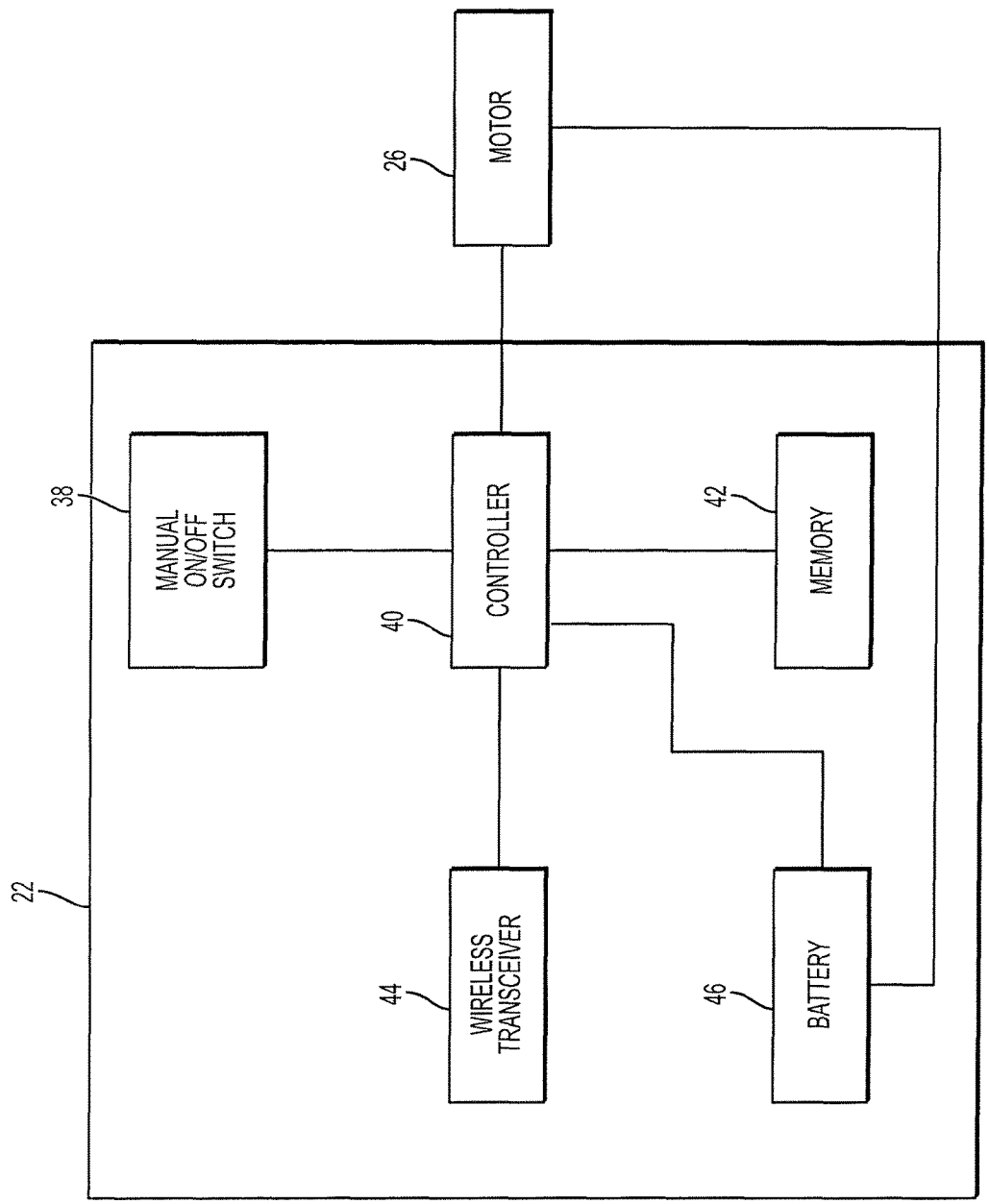

STROLLER ROCKING DEVICE

CROSS-REFERENCE TO RELATED APPLICATION

This application claims the benefit of U.S. Provisional Patent Application No. 62/639,020, filed on Mar. 6, 2018.

BACKGROUND

1. Field

The disclosure of the present patent application relates to accessories for baby strollers, carriages and the like, and particularly to a stroller rocking device for automatically generating a rocking motion for a baby stroller.

2. Description of the Related Art

Rocking a baby stroller is well known to have a calming effect on babies, particularly to quiet the baby or to put the baby to sleep. Traditionally, the person pushing the baby stroller manually imparts the rocking motion to the stroller, which can be both tiring and uncomfortable for the person creating the rocking motion. Although devices for automatically generating a rocking or oscillatory motion are known, such devices tend to be unwieldy, relatively loud, and incompatible with a variety of different stroller configurations, thus severely limiting their effective use. Thus, a stroller rocking device solving the aforementioned problems is desired.

SUMMARY

The stroller rocking device is releasably attachable to a handle of a baby stroller for selectively imparting an oscillating rocking motion to the baby stroller. The stroller rocking device includes a hollow housing having a strap mount pivotally attached to an outer surface thereof. A strap is provided for releasably securing the hollow housing to the handle of the stroller. The strap has a fixed end and a free end, the fixed end being secured to the strap mount. A hook is also attached to the strap mount, and the strap has at least one slot formed therein for releasable engagement by the hook. As noted above, the strap mount is pivotally attached to the hollow housing, allowing the hollow housing to either be oriented horizontally or vertically with respect to the handle, thus providing the option of horizontal or vertical rocking motion imparted to the stroller.

A motor is housed within a central chamber of the hollow housing, and a weighted piston is slidably disposed within a longitudinally extending chamber of the hollow housing. The weighted piston is selectively driven to linearly oscillate within the longitudinally extending chamber by the motor. In order to drive the weighted piston in an oscillatory manner, a cam, such as a pear-shaped cam or the like, may be mounted on a drive shaft of the motor. A first end of a connecting rod may be pivotally attached to the cam, a second end of the connecting rod being pivotally attached to the weighted piston. Driven rotation of the cam is then translated into linear oscillatory motion of the weighted piston.

These and other features of the present disclosure will become readily apparent upon further review of the following specification and drawings.

BRIEF DESCRIPTION OF THE DRAWINGS

FIG. 1A is an environmental perspective view of a stroller rocking device, shown in a horizontal orientation.

FIG. 5 is a block diagram illustrating control components of a control unit of the stroller rocking device.

Similar reference characters denote corresponding features consistently throughout the attached drawings.

DETAILED DESCRIPTION OF THE PREFERRED EMBODIMENTS

Figure 1B:
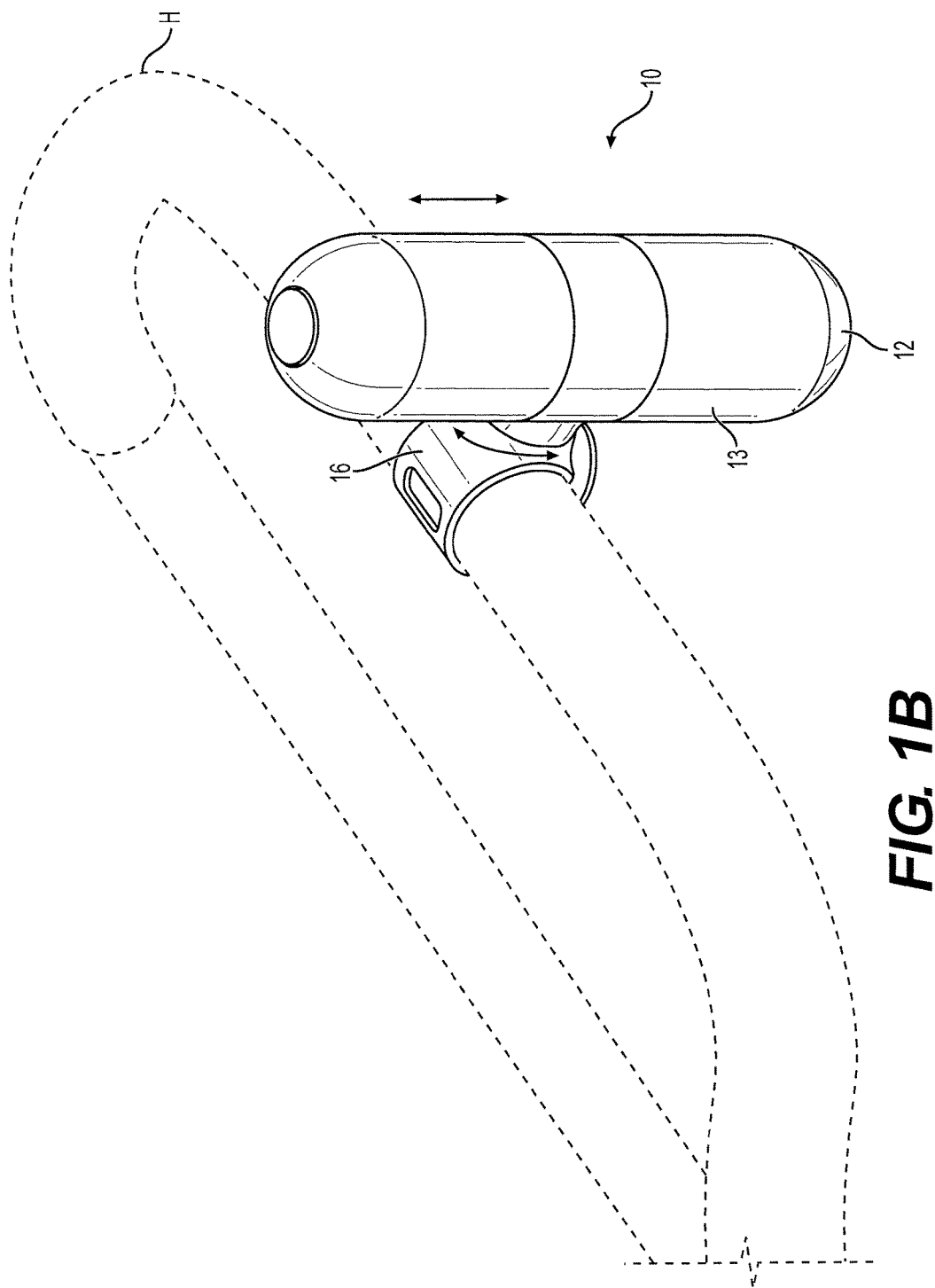
FIG. 1B is an environmental perspective view of the stroller rocking device, shown in a vertical orientation.

The stroller rocking device 10 is releasably attachable to a handle H of a baby stroller for selectively imparting an oscillating rocking motion to the baby stroller. As shown in FIGS. 1A-1C, 2 and 3, the stroller rocking device 10 includes a hollow housing 12 and a strap mount 14 pivotally attached to an outer surface 13 of housing 12. A strap 16 is provided for releasably securing the hollow housing 12 to the handle H of the stroller. It should be understood that the overall dimensions and configuration of the stroller rocking device 10 are shown in FIGS. 1A-1C, 2 and 3 for exemplary purposes only.

Figure 1C:
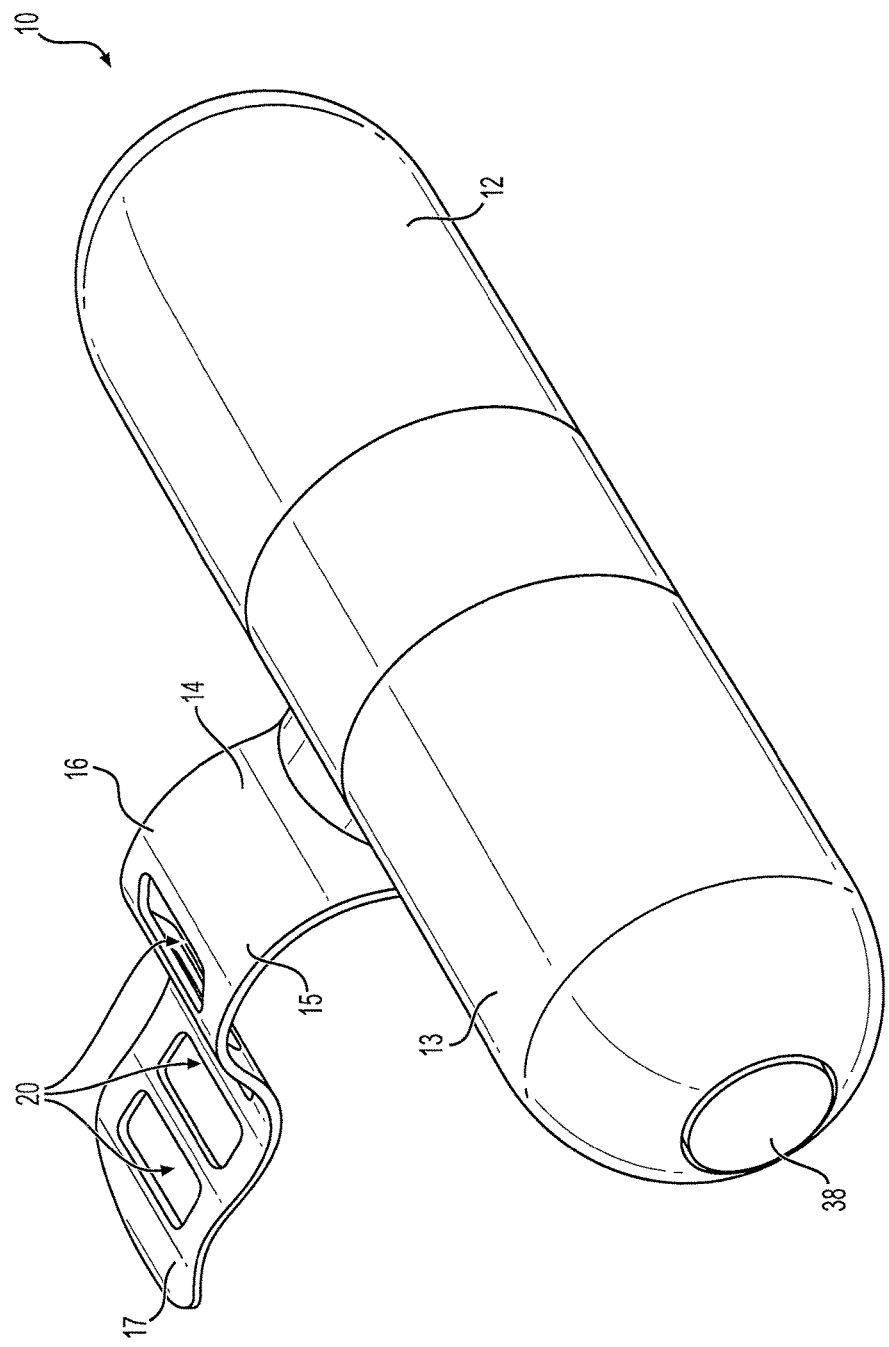
FIG. 1C is a perspective view of the stroller rocking device.
Figure 2:
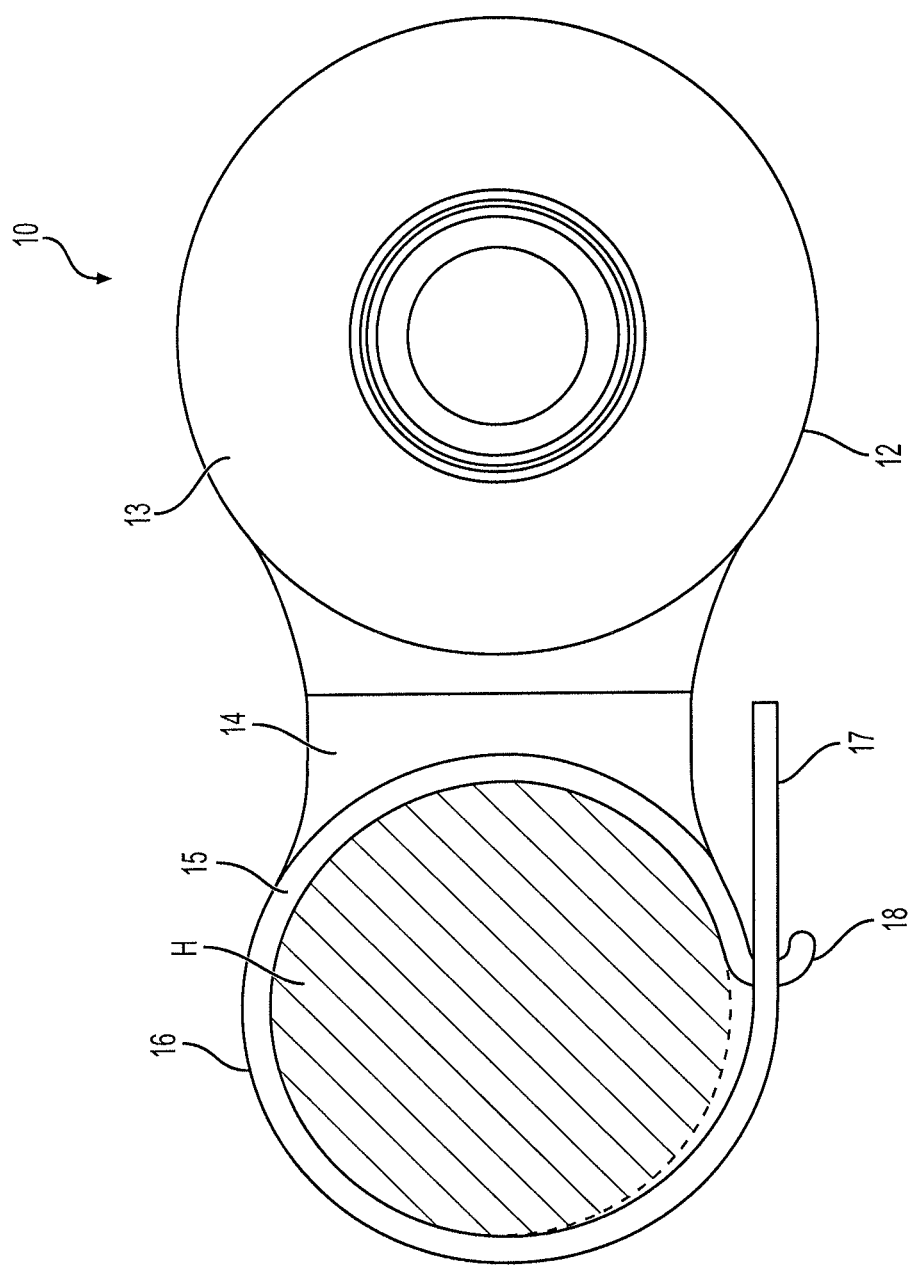
FIG. 2 is a side view of the stroller rocking device.
Figure 3:
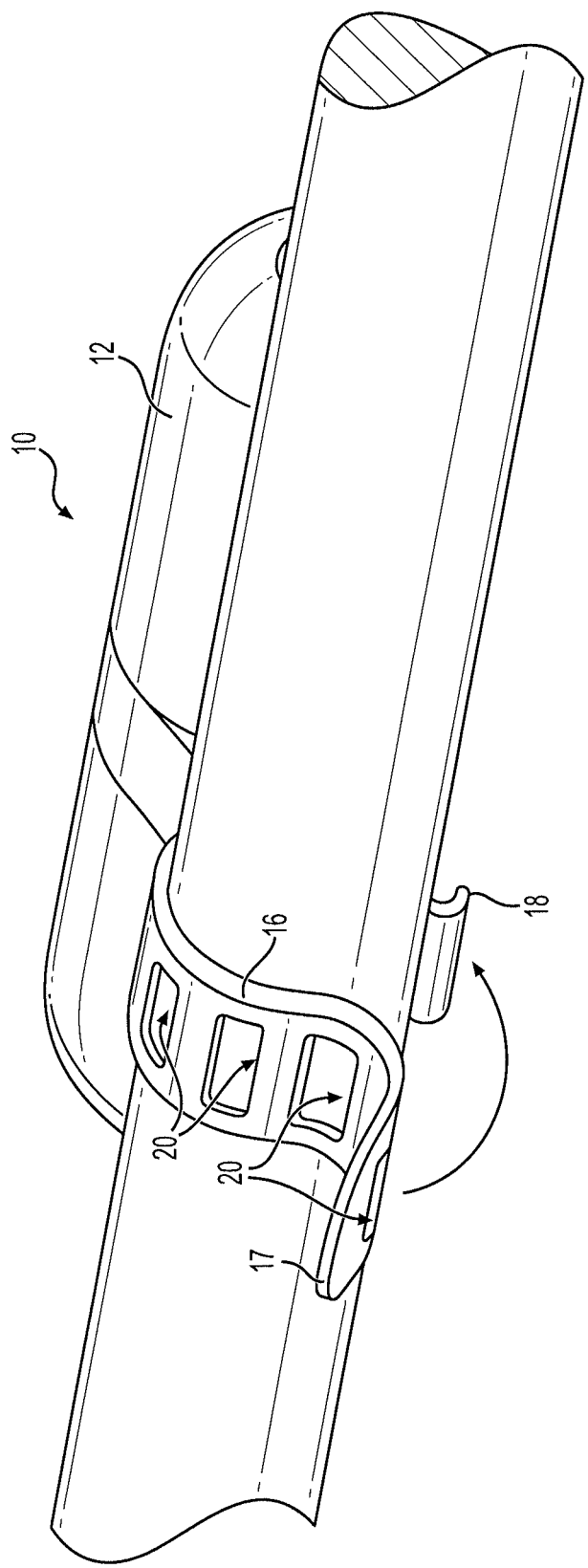
FIG. 3 is an environmental perspective view of the stroller rocking device.

The strap 16 has a fixed end 15 and a free end 17, the fixed end 15 being secured to the strap mount 14. As best seen in FIG. 2, a hook 18 is secured to the strap mount 14 and, as shown in FIGS. 1C and 3, the strap 16 has at least one slot 20 formed therein for releasable engagement by the hook 18. It should be understood that the overall dimensions and configuration of the strap 16, including the shape, size and number of slots 20, are shown in FIGS. 1C and 3 for exemplary purposes only. As noted above, the strap mount 14 is pivotally attached to the hollow housing 12, allowing the hollow housing 12 to be oriented either horizontally (as shown in FIG. 1A) or vertically (as shown in FIG. 1B) with respect to the handle H, thus providing the option of horizontal or vertical rocking motion imparted to the stroller.

Figure 4:
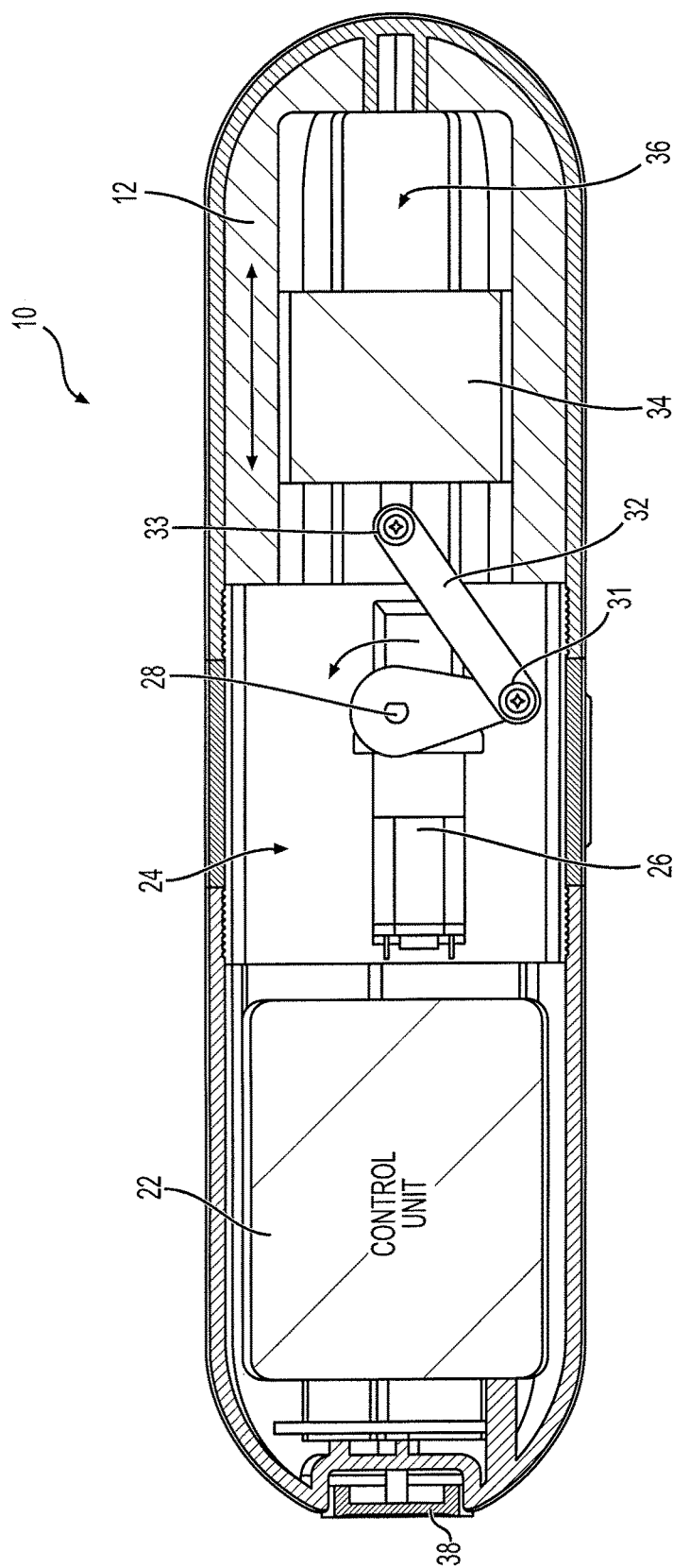
FIG. 4 is a front view in section of the stroller rocking device.

As shown in FIG. 4, a motor 26 is housed within a central chamber 24 of the hollow housing 12, and a weighted piston 34 is slidably disposed within a longitudinally extending cylinder or chamber 36 of the hollow housing 12. The weighted piston 34 is selectively driven to linearly oscillate or reciprocate within the longitudinally extending chamber 36 by the motor 26. It should be understood that the weighted piston 34 may be driven in an oscillatory manner by the motor 26 using any suitable type of connection between the motor 26 and the piston 34. For example, in FIG. 4, a cam 30, such as a pear-shaped cam or the like, is mounted on a drive shaft 28 of the motor 26. A first end 31 of a connecting rod 32 is pivotally attached to the cam 30, and a second end 33 of the connecting rod 32 is pivotally attached to the weighted piston 34. Driven rotation of the cam 30 is translated into reciprocating motion of the weighted piston 34. It should be understood that any suitable type of motor, actuator or the like may be used to drive rotation of the cam 30.

A control unit 22 is disposed within the hollow housing 12. The control unit 22 is in electrical communication with the motor 26 for providing control signals thereto. As shown in FIG. 5, the control unit 22 includes a controller 40 in electrical communication with computer readable memory 42. It should be understood that the controller 40 may be any suitable type of processor, programmable logic controller or the like, and the memory 42 may be any suitable type of computer readable memory for storing control-related data. The control unit 22 further includes at least one battery 46, such as a rechargeable battery or battery pack, for example, for providing power to the controller 40 and the motor 26, as well as a manual on-off switch 38 for selectively powering the stroller rocking device 10 on and off. In FIGS. 1C and 4, the manual on-off switch 38 is shown as an end-mounted push button, but it should be understood that any suitable type of switch may be utilized, and that the switch 38 may be positioned at any desired location on the housing 12.

Additionally, a wireless transceiver 44 may be in communication with the controller 40 for receiving wireless control signals from an external device. For example, a user may program intensity, frequency and/or duration of the rocking motion imparted by the stroller rocking device through a wirelessly communicating portable device, such as a smartphone or the like. The wireless transceiver 44 may be, for example, a Bluetooth® transceiver, allowing for wireless coupling with a wide variety of different wireless portable devices.

It is to be understood that the stroller rocking device is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

I claim:

1. A stroller rocking device, consisting of:
   an elongated enclosed hollow housing, the housing having an outer surface;
   a single strap mount pivotally attached to a central portion of an outer surface of the elongated hollow housing;
   a strap having a fixed end and a free end, the fixed end being secured to the strap mount;
   a hook attached to the strap mount, the strap having at least one slot formed therein for releasable engagement by the hook, the strap being adapted for releasably securing the elongated hollow housing to a handle of a stroller;
   a motor housed within a central chamber of the elongated hollow housing;
   an elongated weighted piston slidably disposed within a longitudinally extending chamber of the hollow housing, the weighted piston having opposed ends, the weighted piston being selectively driven to linearly oscillate within the longitudinally extending chamber by the motor;
   a cam mounted on a drive shaft of the motor;
   a connecting rod having opposed first and second ends, the first end being pivotally attached to the cam and the second end thereof being pivotally attached to one of the opposed ends of the weighted piston wherein the weighted piston is driven to linearly oscillate within the longitudinally extending chamber by the motor; and
   a control unit disposed within the hollow housing opposite to the weighted piston, the control unit being in electrical communication with the motor for providing control signals thereto.

2. The stroller rocking device as recited in claim 1, wherein the control unit comprises:
   a controller;
   at least one battery; and
   a wireless transceiver in electrical communication with the controller.

* * * * *